United States Patent [19]
Kahlman et al.

[11] Patent Number: 4,631,714
[45] Date of Patent: Dec. 23, 1986

[54] APPARATUS FOR FURNISHING DATA SIGNALS FROM AN OPTICALLY READABLE RECORD CARRIER AT THE SAME FREQUENCY AS THE ASSOCIATED SUBCODE SIGNALS

[75] Inventors: Josephus A. H. M. Kahlman; Constant P. M. J. Baggen, both of Eindhoven, Netherlands

[73] Assignee: U.S. Philips Corporation, New York, N.Y.

[21] Appl. No.: 552,639

[22] Filed: Nov. 17, 1983

[30] Foreign Application Priority Data

Sep. 2, 1983 [NL] Netherlands ......................... 8303061

[51] Int. Cl.⁴ ............................................... G11B 7/00
[52] U.S. Cl. ....................................... 369/59; 369/32; 369/47; 369/60; 360/51
[58] Field of Search ......................... 369/32, 47, 59, 60; 360/18, 26, 27, 28, 39, 40, 51, 53; 371/30

[56] References Cited

U.S. PATENT DOCUMENTS 4,382,299   5/1983   Dieterich ....................... 360/38.1 X
4,519,058   5/1985   Tsurushima et al. .............. 369/59 X Primary Examiner—Robert L. Richardson
Attorney, Agent, or Firm—Thomas A. Briody; William J. Streeter; Marianne R. Rich

[57] ABSTRACT

A compact-disc-digital-audio player may be adapted to read optical audio discs in which digital information is stored by controlling the time-base correction circuit in this player by means of a clock signal whose frequency is not a constant reference frequency but a frequency which is locked to the time base of the signal being read. As a result of this both the data signal and the subcode will have the same time base without the necessity of modifying the integrate circuits available for the compact-disc digital-audio player.

4 Claims, 2 Drawing Figures

APPARATUS FOR FURNISHING DATA SIGNALS FROM AN OPTICALLY READABLE RECORD CARRIER AT THE SAME FREQUENCY AS THE ASSOCIATED SUBCODE SIGNALS

BACKGROUND OF THE INVENTION

1. Field of the Invention

The invention relates to an apparatus for reading an optically readable disc-shaped record carrier in which information comprising digital data signals and digital subcode signals is stored, the signal read from the record carrier being applied to a demodulator circuit for demodulating the information, extracting the digital data signals and the digital subcode signals, and generating a first clock signal which is locked to the channel-bit frequency of the signal being read, after which the digital data signal is applied to an error-correction circuit which comprises a buffer register into which the digital data signal is loaded with a frequency which is locked to said first clock signal and from which it is read with a frequency which is locked to a second clock signal supplied by an oscillator, the buffer register being capable of generating a rate error signal which is a measure of the instantaneous degree of filling of the buffer register.

2. Description of the Prior Art

Such apparatus is the well-known Compact-Disc-Digital-Audio player, which is marketed inter alia by N. V. Philips' Gloeilampenfabrieken under the type no. CD 100 and which is described in the magazine "Philips Technical Review", 40, No. 6, which entire issue is incorporated herewith by reference.

In this known apparatus the data signal comprises digital samples of an analog audio signal, which is recovered in the apparatus by means of a digital-to analog converter. The subcode signal contains address information and may also contain information about the content of the data signals. The buffer register is employed for correcting time-base errors in the data signal caused by, for example, eccentricities in the record carrier, because otherwise these time-base errors may become audible in the recovered analogue audio signal, whicch is annoying. In order to correct these time-base errors the frequency of the second clock signal is maintained highly constant, while the first clock signal follows the time base of the data signal being read. The data signal as recovered by the demodulation circuit comprises the digital audio signals together with inter alia the parity bits for error correction. Moreover, these data signals are interleaved, so that the errors are spread and are easier to correct. This correction and the restoration of the correct sequence of the audio signals is effected in the error-correction circuit which requires a memory circuit for this purpose. In the known apparatus the buffer memory is formed by a part of this memory circuit.

A potential use of the compact-disc digital audio system is the use of the record carrier as a read-only memory (ROM), in which case the signal on which the digital data signal is based need not be an analog audio signal, but may be a digital signal which is applied to a digital processing circuit instead of to an audio chain as in the known player.

For such a use it is found to be a disadvantage that the known apparatus generates a data signal with a corrected time base and a subcode signal with a non-corrected time base.

It is the object of the invention to provide an apparatus of the type specified in the opening paragraph, in which this problem is solved without modifying the demodulation circuit or the error-correction circuit, so that for the use the same integrated circuits may be employed for the demodulation circuit and the error-correction circuit as in an apparatus for the reproduction of audio signals.

To this end the invention is characterized in that the oscillator frequency is controlled by the rate error signal in such a sense that variations of the degree of filling rate of the buffer register are counteracted by variations of the read frequency which is dictated by the second clock signal.

The invention is based on inter alia the recognition of the fact that by this step the buffer memory is rendered inoperative with respect to the time-base correction of the data signal, so that the data signal remains in synchronism with the subcode signal, whereas the fact that the two signals no longer have a constant time base does not interfere with the further processing of the signals, because digital processing circuits generally accept substantially larger time base errors than those permissible in audio-signal reproduction. The step in accordance with the invention meets this objective because, oscillator replaces a reference crystal oscillator for generating the second clock signal in the known apparatus, while in the known apparatus the rate error signal is also externally available in order to control the speed with which the record carrier is driven. Therefore, the step in accordance with the invention does not necessitate any modification of the demodulation circuit or the error-correction circuit.

The apparatus in accordance with the invention may further be characterized in that the rate error signal is applied to the voltage-controlled oscillator via a low-pass filter having a bandwidth which is substantially larger than the frequency of variations in the first clock signal caused by eccentricities in the record carrier.

As a result of the step in accordance with the invention the rate error signal is no longer available as error signal for controlling the record-carrier drive.

With respect to the control of the record-carrier drive the apparatus in accordance with the invention may further be characterized in that the apparatus comprises a reference oscillator for supplying a reference clock signal derived from a demodulator and a comparator circuit for comparing the first clock signal with the reference clock signal for controlling the record-carrier drive.

An alternative to this apparatus may further be characterized in that the apparatus comprises a reference oscillator for supplying a reference clock signal and a comparator circuit for comparing the second clock signal with the reference clock signal for controlling the record-carrier drive.

BRIEF DESCRIPTION OF THE DRAWING

The invention will now be described in more detail, by way of example, with reference to the drawing, in which.

DESCRIPTION OF THE PREFERRED EMBODIMENTS

Figure 1:
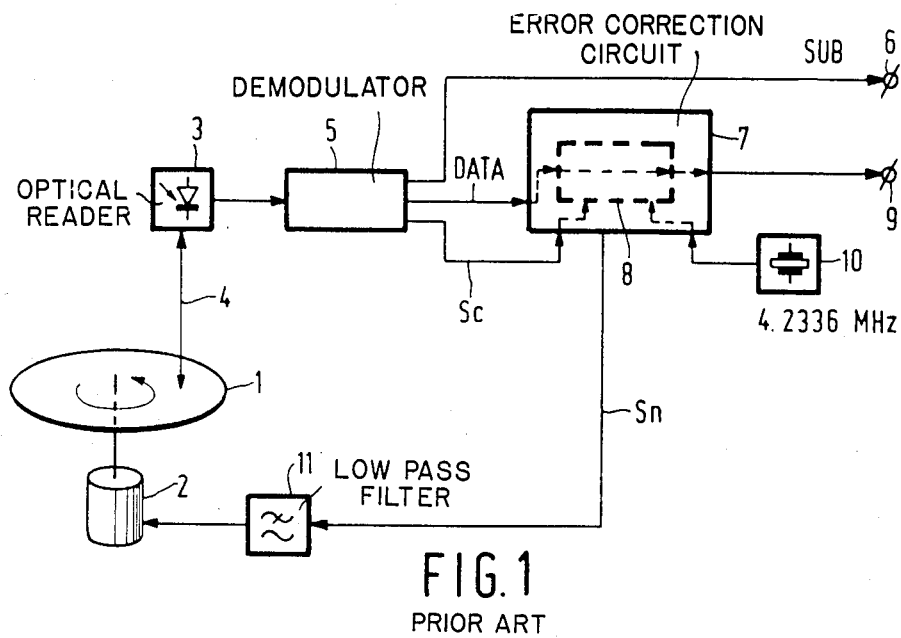
FIG. 1 shows a schematic block diagram of a known apparatus.

FIG. 1 schematically shows the relevant parts of the known "Compact-Disc-Digital-Audio" player as described in the aforementioned publication. This player comprises an optical read device 3 which employs a beam 4 for reading a disc-shaped record carrier 1 driven by a motor 2. The signal read is applied to an EFM-demodulator 5, in which the signal is demodulated in conformity with the compact-disc-digital-audio standard. The EFM-demodulator 5 generates a clock signal $S_c$ which is in synchronism with the signal read and which has an average frequency of 4.3218 MHz based on 588 channel bits per frame. Moreover, the signal read is split into a subcode signal SUB, which is applied to an output 6 and a data signal DATA. This data signal DATA is applied to a circuit 7 for further processing, in which circuit this signal is error-corrected in conformity with the compact-disc-digital-audio standard, is rearranged and is applied to an output 9. For this processing the circuit 7 comprises a memory of which a part is arranged as a buffer store 8. The data signal DATA is loaded into this buffer 8 in synchronism with the clock signal $S_c$, a correction being applied for the fact that the clock frequency of 4,3218 MHz is based on 588 channel bits per frame while the DATA signal comprises a smaller number of bits per frame as a result of the extraction of the channel bits and the EFM-demodulation, and the signal is read out with a clock signal which is locked to a constant clock signal supplied by a crystal oscillator 10 and having a frequency of 4,2336 MHz, which frequency is based on a demodulated data signal which is free of parity bits and which exclusively comprises the bits of the digital audio signal. The actual frequency with which the buffer 8 is read out differs slightly from crystal oscillator frequency because this buffer has an 8-bit parallel organization and the signal in the buffer still contains parity bits. In this way the data signal is rid of time-base errors, for example these caused by eccentrics of the record carrier 1 or by irregularities in the drive by the motor 2. The buffer 8 is designed so that it generates a signal $S_n$ which is a measure of the instantaneous degree of filling of the buffer 8 i.e. a measure of the instantaneous time error. This signal $S_n$ is applied to the motor 2 via a low-pass filter 11 in order to control the speed in such a way that the average time error is zero. In this way a data signal with a constant time base is obtained on output 9, which is essential because in the known player the data signal comprises digitized audio information, so that time errors may become audible to an annoying extent. The subcode SUB then appears on output 6 without the time error correction, which is not annoying for audio applications.

One potential use of the compact-disc digital audio system is the use of the record carrier as a read-only memory (ROM), the signal on which the EFM encoded signal is based not being an analog audio signal but a digital signal which is not applied to an audio chain as in the known player, but to a digital processing chain. For encoding several possibilities are available. For example, it is possible to process a digital signal as though it were an analog signal and to convert this signal by means of an analog-to-digital converter and an EFM-encoding circuit, a higher storage capacity being attainable by first converting the original digital signal into a multi-level logic signal. Alternatively, it is possible to arrange the bits of a digital signal in groups and to treat them in the same way as the output signal of an analog-to-digital converter. In the first case the digital signal is recovered after digital-to-analog conversion and in the second case it is recovered without digital-to-analog conversion.

For the said application it is found to be a problem that the subcode SUB on output 6 is no longer in synchronism with the corrected data signal on output 9. For this problem solutions are conceivable which have the disadvantage that, for example, the circuit 7 has to be modified. Since this circuit is generally an integrated circuit and it is disadvantageous to manufacture a dedicated version of this integrated circuit for the aforementioned use, it is desirable to adopt a solution which does not affect the circuit 7.

Figure 2:
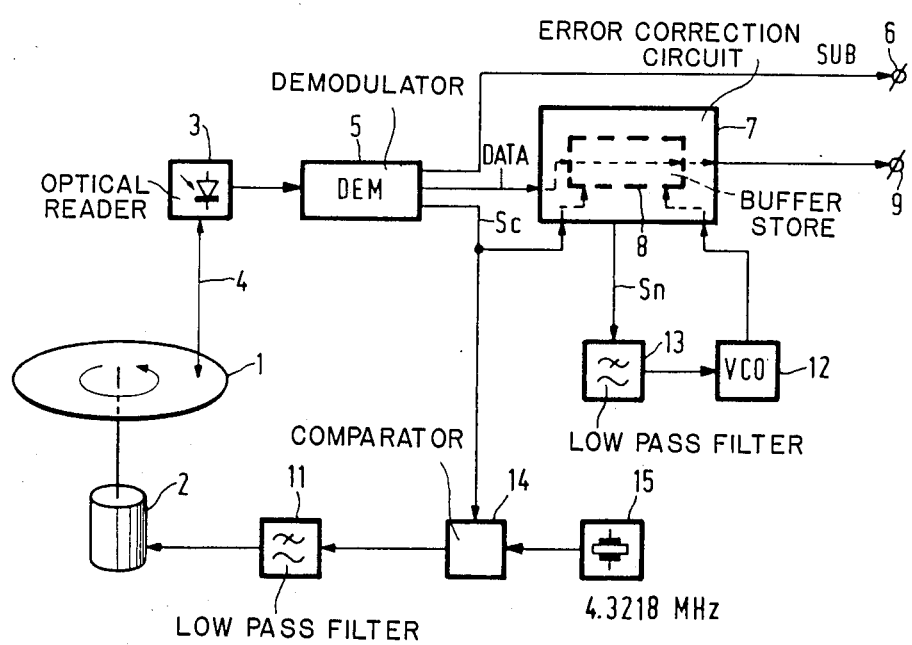
FIG. 2 shows a schematic block diagram of an apparatus in accordance with the invention.

FIG. 2 illustrates such a solution. In this Figure parts corresponding to those in FIG. 1 bear the same reference numerals.

In the apparatus shown in FIG. 2 the crystal oscillator 10 is replaced by a voltage-controlled oscillator 12. Via a low-pass filter 13 this voltage-controlled oscillator 12 is controlled by the signal $S_n$ which is a measure of the instantaneous degree of filling of the buffer 8. As a result of this the buffer 8 is read out in such a manner that the buffer 8 is always filled substantially to a reference level or in such a manner that reading is effected at the same rate (depending on the cut-off frequency of the filter 13) as loading. As a consequence, the data signal on output 9 appears with the same irregularity as clock signal $S_c$, i.e. in synchronism with the subcode SUB on output 6.

In order to maintain the average rate with which the data is read out substantially constant a phase comparator circuit 14 compares the clock signal $S_c$ with the output signal of a crystal oscillator 15 which is tuned to a frequency of 4,3218 MHz. The result of this comparison is used for controlling the motor 2 via a low-pass filter 11, so that the clock signal $S_c$ and consequently the rate with which the data signal is read out is stabilized with respect to the frequency of the crystal oscillator 15.

Preferably the bandwidth of the low-pass filter 13 extends beyond the frequency corresponding to the disc eccentricity so as to enable variations in the clock signal $S_c$ as a result of this eccentricity to be tracked by the oscillator 12. This bandwidth is, for example, 500 Hz.

Since the interlock between the clock signal $S_c$ and the oscillator 12 is fast relative to the speed control of the motor 2, it is alternatively possible to use the output signal of the oscillator 12 for the motor control instead of the clock signal $S_c$. The crystal oscillator 15 must then be tuned to 4,2336 MHz instead of to 4,3218 MHz.

What is claimed is:

1. Apparatus for modifying a digital audio player furnishing data signals at a constant rate and subcode signals at a varying channel bit frequency to furnish said data signals at said channel bit frequency, said player having motor means for driving disc-shaped record carrier means, read-out means for reading out said subcode signals and said data signals from said record carrier means at said channel bit frequency, error correction circuit means connected to said read out means and having a buffer storage receiving said data signals at said channel bit frequency, fixed frequency oscillator means external to said error correction circuit means for controlling read-out of said data signals from said buffer storage means at said constant rate, said error correction circuit means further generating an error signal corresponding to deviations of said channel bit frequency from said constant frequency, said apparatus comprising voltage controlled oscillator means for generating a control signal for controlling said readout of said data signals from said buffer storage means and applying said control signal to said buffer storage means; and means connected to said voltage controlled oscillator means for applying said error signal to said voltage controlled oscillator means so that said frequency of said voltage controlled oscillator means varies in accordance with said error signal and therefore in accordance with said channel bit frequency.

2. An apparatus as claimed in claim 1, wherein said channel bit frequency varies over a first frequency band;

further comprising low-pass filter means connected to said data processing means for filtering said error signal prior to application to said voltage controlled oscillator means, said low-pass filter means having a bandwidth substantially larger than said first frequency band.

3. Apparatus as claimed in claim 1, wherein said player further comprises means for generating a first clock signal having a frequency locked to said channel bit frequency; and wherein said modifying apparatus further comprises reference oscillator means for supplying a reference clock signal, comparator circuit means connected to said reference oscillator means for comparing said reference clock signal to said first clock signal and generating difference signal corresponding to the difference in frequency therebetween, and means for applying said difference signal to said record carrier drive means for controlling the speed thereof.

4. Apparatus as claimed in claim 3, wherein said means for applying said difference signal to said record carrier drive means comprises a low-pass filter.

* * * * *